Dec. 9, 1958   M. J. MITCHELL   2,863,517
CLUTCH KIT FOR TRACTOR DRIVE WHEELS
Filed Jan. 25, 1954   5 Sheets-Sheet 1

INVENTOR.
MELVILLE J. MITCHELL
BY
Carlson, Pitzner, Hubbard & Wolfe
ATTORNEYS.

Dec. 9, 1958  M. J. MITCHELL  2,863,517
CLUTCH KIT FOR TRACTOR DRIVE WHEELS
Filed Jan. 25, 1954  5 Sheets-Sheet 2

INVENTOR.
MELVILLE J. MITCHELL
BY
ATTORNEYS.

INVENTOR.
MELVILLE J. MITCHELL
BY
ATTORNEYS.

Dec. 9, 1958 M. J. MITCHELL 2,863,517
CLUTCH KIT FOR TRACTOR DRIVE WHEELS
Filed Jan. 25, 1954 5 Sheets-Sheet 4

INVENTOR.
MELVILLE J. MITCHELL
BY
ATTORNEYS.

United States Patent Office 2,863,517
Patented Dec. 9, 1958

2,863,517

CLUTCH KIT FOR TRACTOR DRIVE WHEELS

Melville J. Mitchell, Birmingham, Mich., assignor, by mesne assignments, to Massey-Ferguson Inc., a corporation of Maryland Application January 25, 1954, Serial No. 405,703

8 Claims. (Cl. 180—75)

The present invention relates to kits or attachment mechanisms for use on tractor drive wheels by means of which one of the tractor's rear wheels, to which the attachment is applied, can be selectively either clutched for full driving action or unclutched for free-wheeling, just as desired.

One instance in which such a kit is advantageous is an installation where a heavy side-mounted agricultural implement is equipped with an outboard wheel; and in which event it is desirable to drive the outboard wheel from the live axle of an adjacent rear traction wheel of a tractor to which the implement is connected.

In the agricultural implement art, it has been suggested that relatively heavy and bulky implements may be coupled to a tractor in side-mounted fashion, that is, so that part of the weight of the implement is carried by the tractor and the remainder by an outboard ground wheel. By way of example, the ground wheel may be located parallel to, but outwardly spaced from, one of the rear drive wheels of the tractor. If the motive power should, in such an installation, be supplied entirely through the tractor's rear drive wheels, it would be directed along the longitudinal center line of the tractor, and the implement, with its ground wheel, would create a drag or side draft tending to turn the tractor and make steering difficult, especially on uneven ground where the gripping effect of the front steering wheels may vary.

To obviate such difficulties, it has been proposed that a driving connection be made from the power axle of the tractor to the outboard wheel of the implement and with the adjacent tractor wheel journaled for free-wheeling. The drive effort is is in such instance exerted by the two outer wheels of the tractor-implement combination, the side drag and steering difficulties being substantially eliminated, while the adjacent tractor wheel continues, however, to provide support. Such a drive mechanism for a tractor-implement combination is shown and described in the copending application of Robert W. King, Serial No. 226,783, filed May 17, 1951 (Patent No. 2,668,597, issued February 9, 1954), and assigned to the assignee of the present application.

The general aim or object of the present invention is to provide a mechanism by means of which a tractor's drive wheel, as for example in such an installation as that just described, can readily be conditioned optionally for either its normal driving action or for free-wheeling. The mechanism for selective clutching and unclutching so employed for a traction wheel may, of course, be useful in installations other than the example indicated.

More particularly, it is an object of the invention to provide a self-contained clutch mechanism for the wheel of a tractor having an axle extension for driving a side-mounted implement, which clutch mechanism affords selective engagement of the tractor wheel to be either free-wheeled on, or power-driven by, the axle; which affords convenient and quick manual selection of the engagement by an operator remaining on the tractor, without the necessity for attaching or detaching separate loose coupling elements; which permits the tractor-implement combination to be driven with either two or three wheel drive as dictated by ground conditions to obtain the necessary traction; and which permits the tractor to be readily positioned for attachment to the implement before the tractor wheel need be disengaged for free-wheeling.

A still further object of the invention is the provision of a new and improved clutch mechanism of general utility which may cause selective engagement or disengagement of driving and driven members through the simple manual operation of rotatably positioning a cam element carried by one of the members.

Further objects and advantages of the invention will become apparent as the following description proceeds, taken in conjunction with the accompanying drawings, in which.

Figure 1:
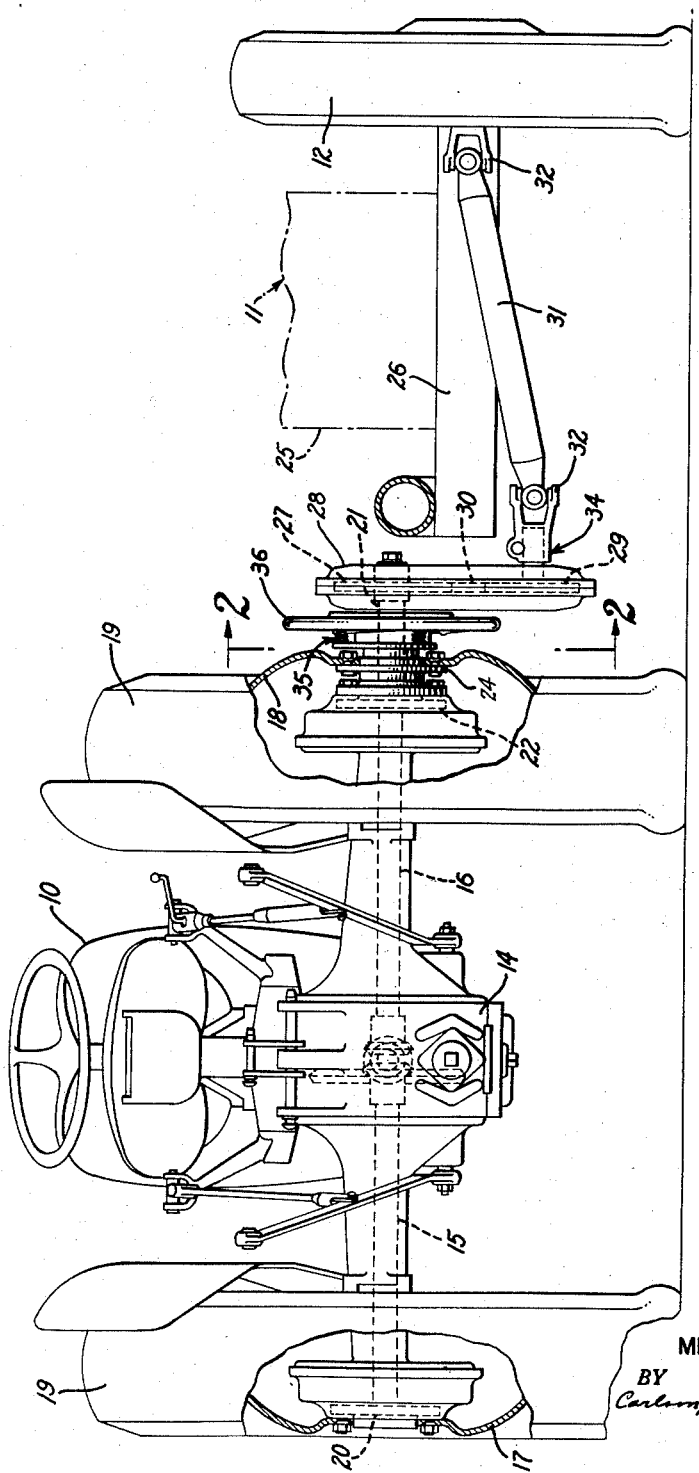
Figure 1 is a rear elevation of a tractor-implement installation equipped with a clutch kit embodying the features of the present invention, such kit being indicated in heavy outline.

Although particular embodiments of the invention have been shown and described in some detail, there is no intention to thereby limit the invention to the details of such embodiments. On the contrary, the intention is to cover all alterations, modifications, and equivalents falling within the spirit and scope of the invention as defined in the appended claims.

Referring now more particularly to the drawings, there is illustrated, in accordance with the invention, a clutch kit as employed in connection with one drive wheel of a farm-type tractor 10. The tractor, in this instance, is adapted to receive a side-mounted implement 11, indicated generally on the right and partially supported by an outboard ground wheel 12. While the tractor may take various forms, those skilled in the art will recognize that illustrated as the familiar "Ferguson" tractor. It is shown as including at its rear end a center housing 14 from which two power axles 15 and 16 extend transversely to drive rear traction wheels 17 and 18 equipped with pneumatic tires 19.

The left rear wheel 17 is bolted, in its normal position, to a flange 20 on its axle 15 while the right axle 16 carries the novel clutch kit for an implement drive. The clutch kit comprises an extension or stub shaft 21 having an inner end flanged and bolted to the right axle flange 22 in place of the right wheel 18. The stub shaft 21 extends to drive power-connecting means 24 for the implement ground wheel 12. The details of the implement 11 are not of importance in connection with the present invention, and it is believed sufficient to note that it includes generally a body 25 supported on a frame 26 connected at the side of the tractor, with the outboard ground wheel 12 spaced laterally and generally parallel to the rear tractor wheels.

In order to supply power to the ground wheel 12, there is provided an off-set chain drive including a sprocket 27 carried by the stub shaft 21 and journaled in a drive housing 28 which also journals a lower sprocket 29. A chain 30 connects the two sprockets, the latter one being mounted on a shaft 31, including universal joints 32 at either end, extending to the ground wheel 12. The details and advantages of this off-set implement drive arrangement are fully disclosed in the present inventor's copending application Serial No. 378,302, filed September 3, 1953, now Patent No. 2,756,831, granted July 31, 1956. Therefore, they form no part of the present invention.

The right rear wheel 18 is mounted on a hub 34 freely journaled on, but selectively engageable by associated clutch means 35 to be driven by, the stub shaft 21. In utilizing the present kit, the wheel 18 need only be removed from the axle flange 16 (i. e., from the position corresponding to that of the left wheel), the stub shaft 21 bolted to the axle in place of the wheel, and the wheel, in turn, bolted to a flange on the hub 34. Once the kit has thus been placed on the tractor, it may be left there semi-permanently as desired to permit quick mounting or dismounting of an implement, since by the clutch means 35 the tractor wheel 18 may be selectively operated either in a free-wheeling or the normal positively driven manner. Normally, the wheel is free-wheeled when the implement is attached, and positively driven when the implement is detached. However, as will become apparent, the wheel 18 may be used as a third power wheel even with the implement and according to the traction requirements dictated by various types of ground conditions.

The clutch assembly 35 is carried on the stub shaft 21 and includes a manually rotatable cam element 36 for actuation. The operator of the tractor can effect this operation without dismounting from the tractor and without assembling any loose pieces or parts. With the kit installed on the tractor the right wheel may be employed as a power wheel during positioning of the tractor for engagement with the implement, and once the implement is side-mounted on the tractor to be driven through the transmission shaft, motive power may be applied to the left wheel of the tractor and the ground wheel of the implement with the right wheel free-wheeled, or all three wheels may be employed as power wheels.

Figures 2, 3:
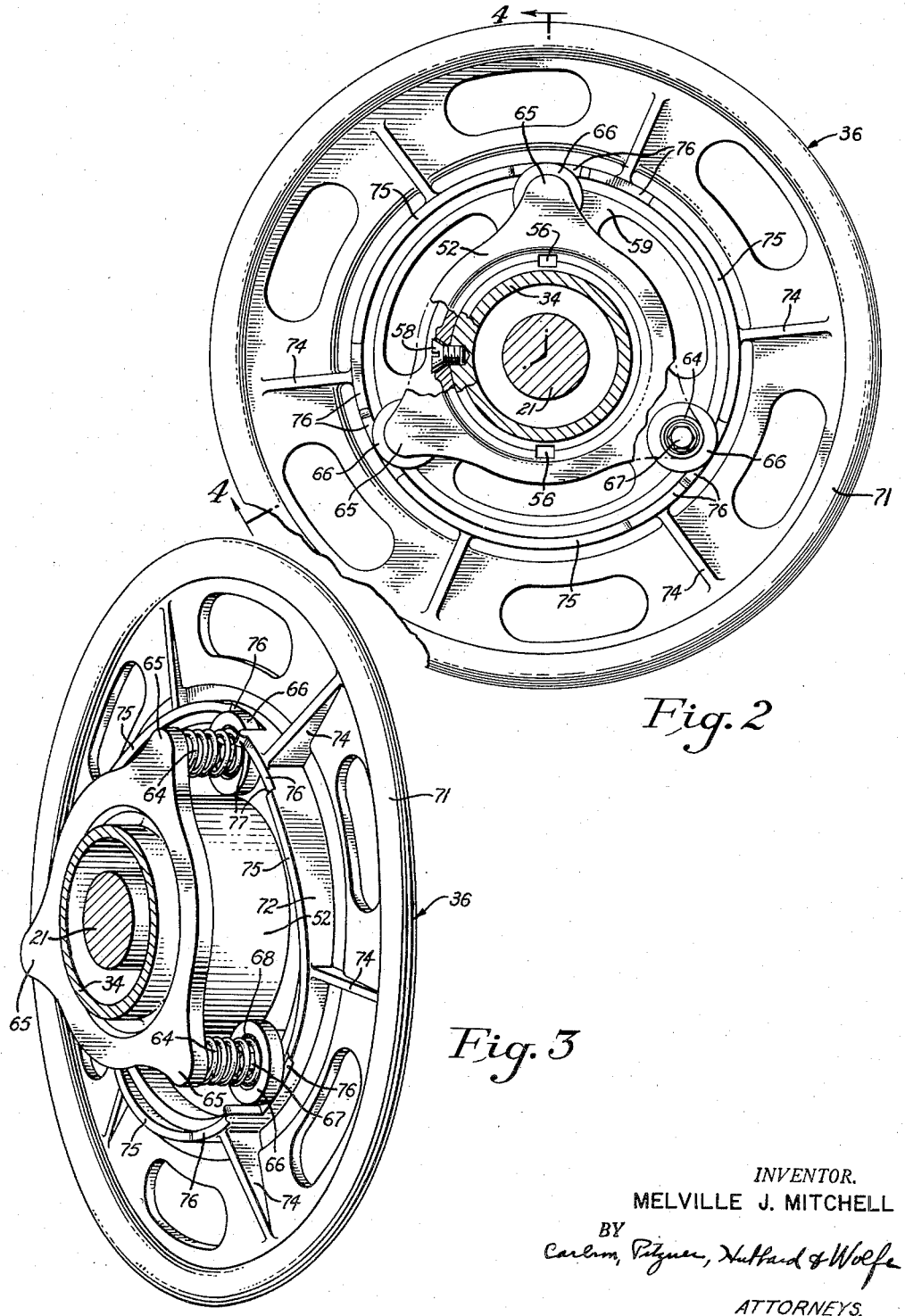
Fig. 2 is an enlarged side elevation of the clutch kit, partially in section along line 2—2 in Fig. 1.
Fig. 3 is an enlarged perspective view of the mechanism shown in Fig. 2.
Figures 4, 5:
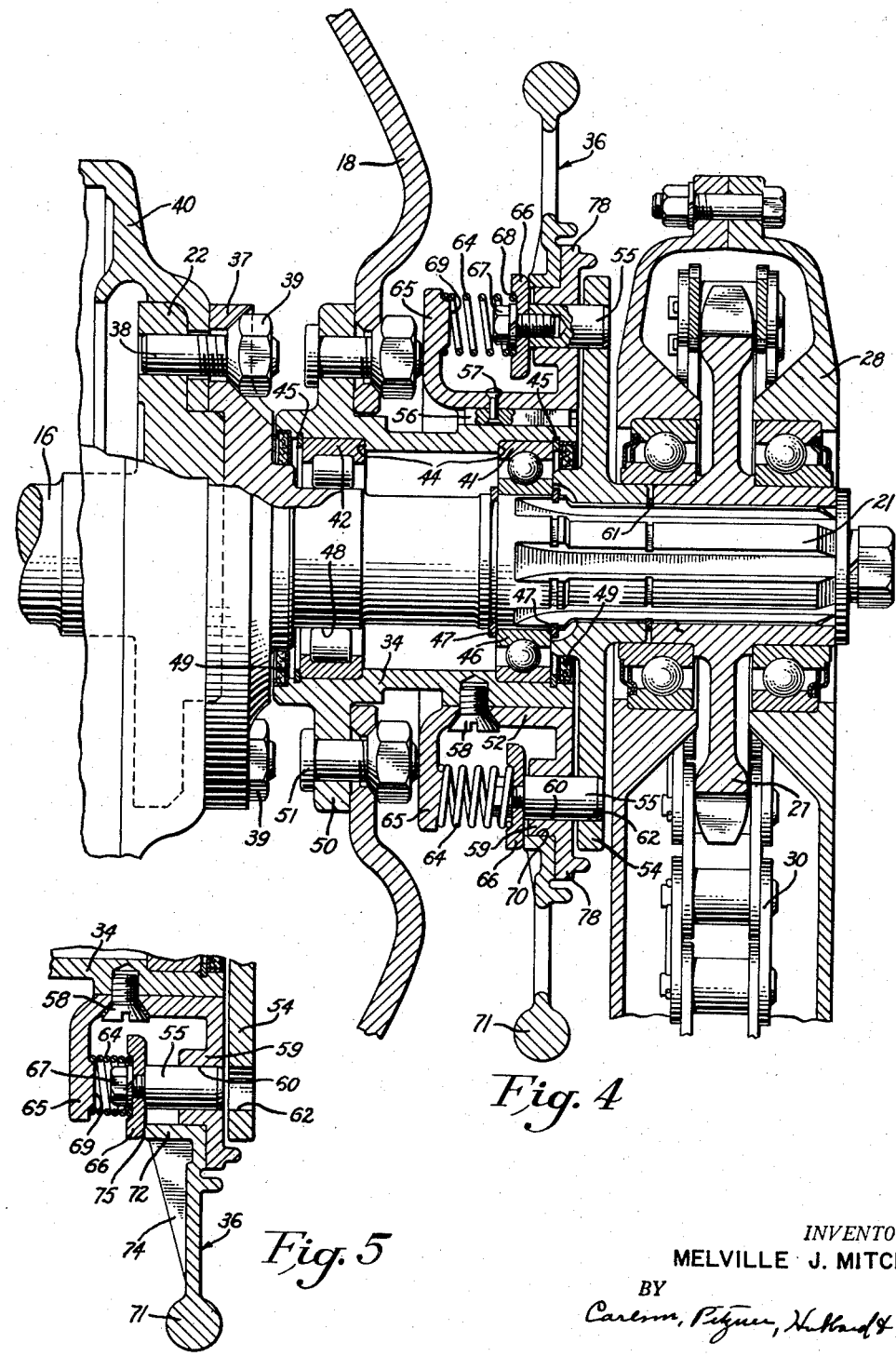
Fig. 4 is an enlarged sectional view taken substantially along line 4—4 in Fig. 2.
Fig. 5 is a fragmentary sectional view showing one of the clutch elements disengaged as compared to the engaged position of the same element shown in Fig. 4.

With more particular reference to Figs. 2, 3, and 4, the inner flange 37 of the extension shaft 21 is coupled to the corresponding flange 22 on the right axle 16 by means of bolts 38, and cooperating nuts 39, inserted through registering openings. A brake drum 40 may be clamped between these two connected flanges as shown, so that the brake system of the tractor is effective in braking the ground wheel 12 when the implement 11 is attached and also in braking the right wheel 18 when it is power driven. The freely rotatable hub 34 is journaled on the stub shaft 21 by suitable bearings located at either end, in this instance, a ball bearing at the right and a roller bearing at the left. The respective outer races 41 and 42 are positioned and secured by engagement with shoulders 44 defined in the hub and with lock rings 45 positioned in suitably defined annular recesses. The inner ball race 46 is axially secured to the shaft by lock rings 47 positioned in annular grooves and engaging either side of the inner race. A machined surface 48 on the shaft cooperates with the roller bearing so that no inner race is necessary at that location. Suitable seals 49 at either end of the hub prevent the entrance of foreign matter into or the loss of lubricant from the bearings. The wheel disc 18 is mounted on an annular flange 50 of the hub 34, as indicated, by bolts 51 extending through registering holes. The wheel 18 is thus freely rotatable on the stub shaft 21, through the hub 34, and may support its share of weight without causing any drag or turning effect.

The wheel 18 and hub 34, however, may be operatively connected with the stub shaft 21 to be positively driven, either when the implement is dismounted from the tractor or when three-wheel drive of the tractor and implement is desired. The selective clutching is accomplished by a self-contained manually operated cam mechanism comprising a flange member or pin housing 52 mounted on the hub and a corresponding drive plate 54 carried by the shaft, together with connecting detent pins 55 positionable by manually operable cam means. The pin housing 52 is generally annular in shape and is positioned over one end of the hub 34, being secured against circumferential displacement by one or more longitudinal keys 56 inserted in corresponding axial slots and preferably locked to the housing by rivets 57. A locating set screw 58 extending radially through the pin housing and into threaded engagement with the hub locks the pin housing against axial movement. The pin housing 52 includes an annular flange 59 having a plurality of spaced, axially extending openings 60 in its periphery.

The pin housing 52 and its annular flange 59 constitute the hub and wheel as driven members in a selective clutching mechanism, the driving member being the cooperating pin drive plate 54 which is a flange of generally annular shape splined to the extension shaft 21 and secured against axial displacement by a locking ring 61 positioned in an annular groove of the shaft. The periphery of this drive plate contains a plurality of axial openings 62 adapted to register with those in the flange 59 of the pin housing.

The pin housing carries the plurality of detent pins 55 slidably disposed in the openings 60 of its flange so that they may be moved axially to the right, as viewed in Fig. 4, to effect a driving engagement with the openings 62 in the drive plate. Preferably, the free ends of the pins are beveled to facilitate their entry into the openings 62 of the drive plate. The detent pins 55 are spring biased toward that position by compression springs 64 interposed between ears 65 on the pin housing and washers 66, also constituting cam followers, carried by bolts 67 threadably engaging the pins 55. As seen best in Fig. 3, the biasing springs 64 are held in place by engagement in annular recesses 68 defined in the washers and, as seen in Fig. 4, by extending over correspondingly located bosses 69 at their other ends.

The pins 55 are held against the biasing force of the springs 64, and their axial position thus determined, by the cam element or wheel 36 rotatably mounted on an axially extending collar 70 of the pin housing. The cam wheel 36 (Fig. 3) includes an outer rim 71 for manual rotation, and an axially extending collar 72, re-enforced by radial ribs 74 and forming a plurality of arcuate cam surfaces (in the exemplary embodiment, three cam surfaces 75) having an axial rise along their circumferential dimension. As shown, each of the cam followers or washers 66 rides on one of the arcuate cam surfaces 75. Each of the three camming surfaces includes notched dwell points 76 at either end into which the washers 66 may fit to prevent accidental movement of the cam. Chamfered corners 77 permit the washers to slide into or out of the dwell points under positive actuating forces. It will be noted that the biasing force of the springs 64 securely holds the cam following washers 66 against the cam surfaces 75 and, in turn, holds the cam wheel 36 against a radial rim 78 on the pin housing.

In order to release or couple the pin housing 52 and drive plate 54 by withdrawing or inserting the detent pins 55 from or into the openings 62 of the drive plate, it is only necessary to manually rotate the cam element 36 to its proper position, where it is retained by the dwell points 76. Thus, the hub 34 and wheel 18 may be placed in a free-wheeling condition or in a positively driven condition as desired by a simple manual operation which may be performed by an operator on the tractor and without removing or connecting any loose parts. The clutch mechanism is shown in Figs. 3 and 4 in the engaged position with the cam element 36 rotated to have the pin washers 66 bearing against those dwell points 76 on the cam surfaces 75 which permit pins 55 to extend through the openings 60 and 62 or both the pin drive plate 54 and pin housing 52. In Fig. 5, however, the cam element 36 is shown as having been rotated through approximately 120 degrees to the position at which the pin washers 66 bear against the cam surfaces 75 at the other dwell points, holding the pins against the force of the biasing springs 64 withdrawn from engagement with the drive plate.

In clutching the wheel 18 from its free-wheeling condition to be power driven, by rotating the cam element 36 to permit the detent pins 55 to engage with the drive plate 54, it is not necessary that the openings 60 and 62 in the pin housing and drive plate be first accurately alined. If the pins 55 do not immediately slip into the openings 62 of the drive plate, they will be spring biased against its face and will snap into the openings upon a slight movement of the tractor causing relative rotation between the pin housing and the drive plate.

In assembling the kit for use, the hub 34 is normally permanently journaled, or at least is first journaled on the stub shaft 21. As previously indicated, the right rear wheel 18 is removed from the axle 16, and the inner flange 37 of the stub shaft bolted in the wheel's original place. Then the wheel is bolted to the flange 50 of the hub, and the pin housing 52, carrying the cam wheel 36 and pins 55, is mounted on the hub by slipping the keys 56, carried by the pin housing, into the mating grooves on the hub and setting the screw 58. The drive plate 54 may then be placed on the splines of the stub shaft, and the assembly is complete. To couple the implement drive, the sprocket 27 need then only be slipped onto the splines of the stub shaft as shown.

Figure 6:
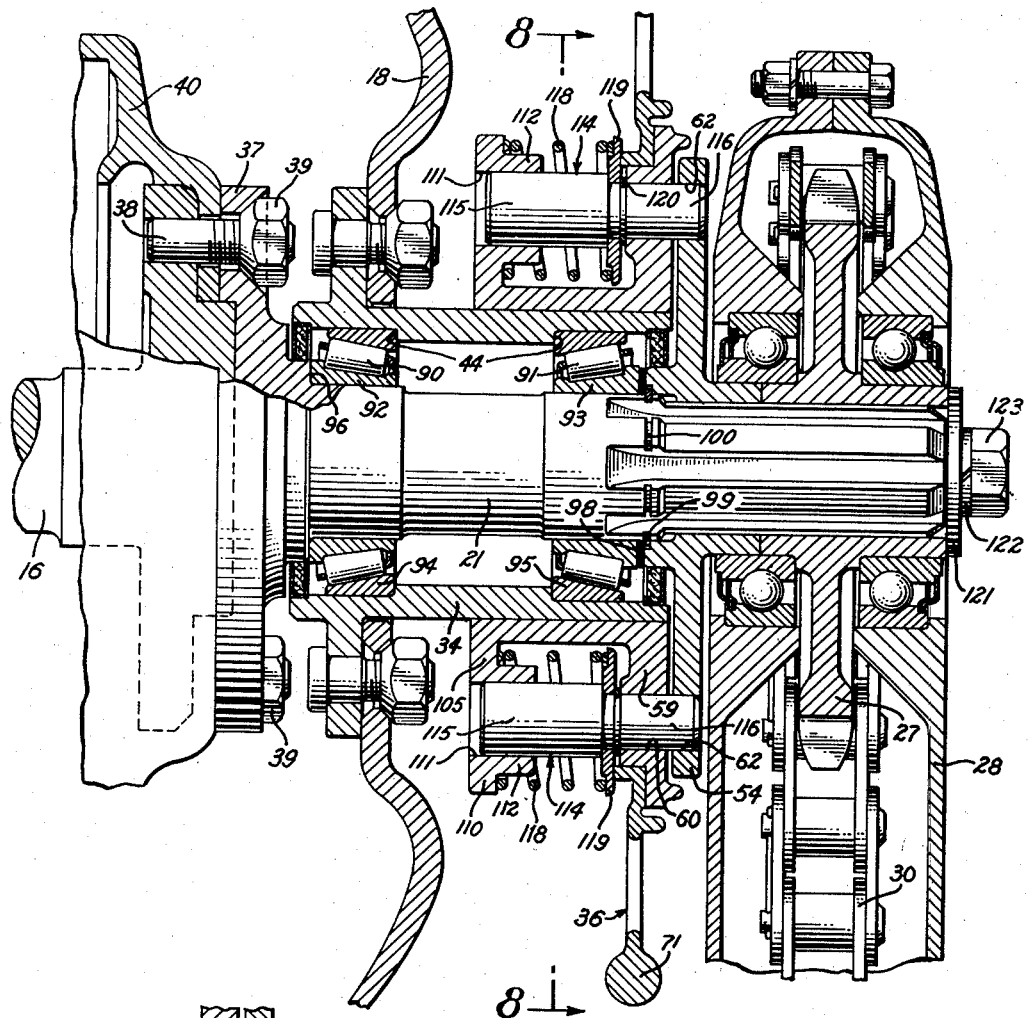
Fig. 6 is similar to Fig. 4, illustrating a modified and preferred embodiment of the present invention.
Figure 7:
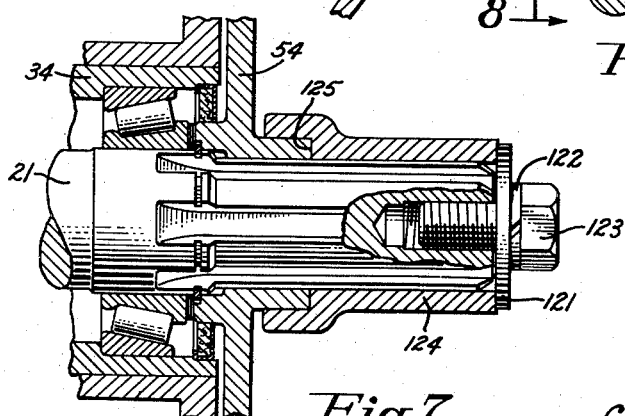
Fig. 7 is a fragmentary sectional view showing a thrust sleeve employed with the clutch kit when the side-mounted implement is disconnected from the tractor, and the latter is to be operated independently without removal of the clutch kit.
Figure 8:
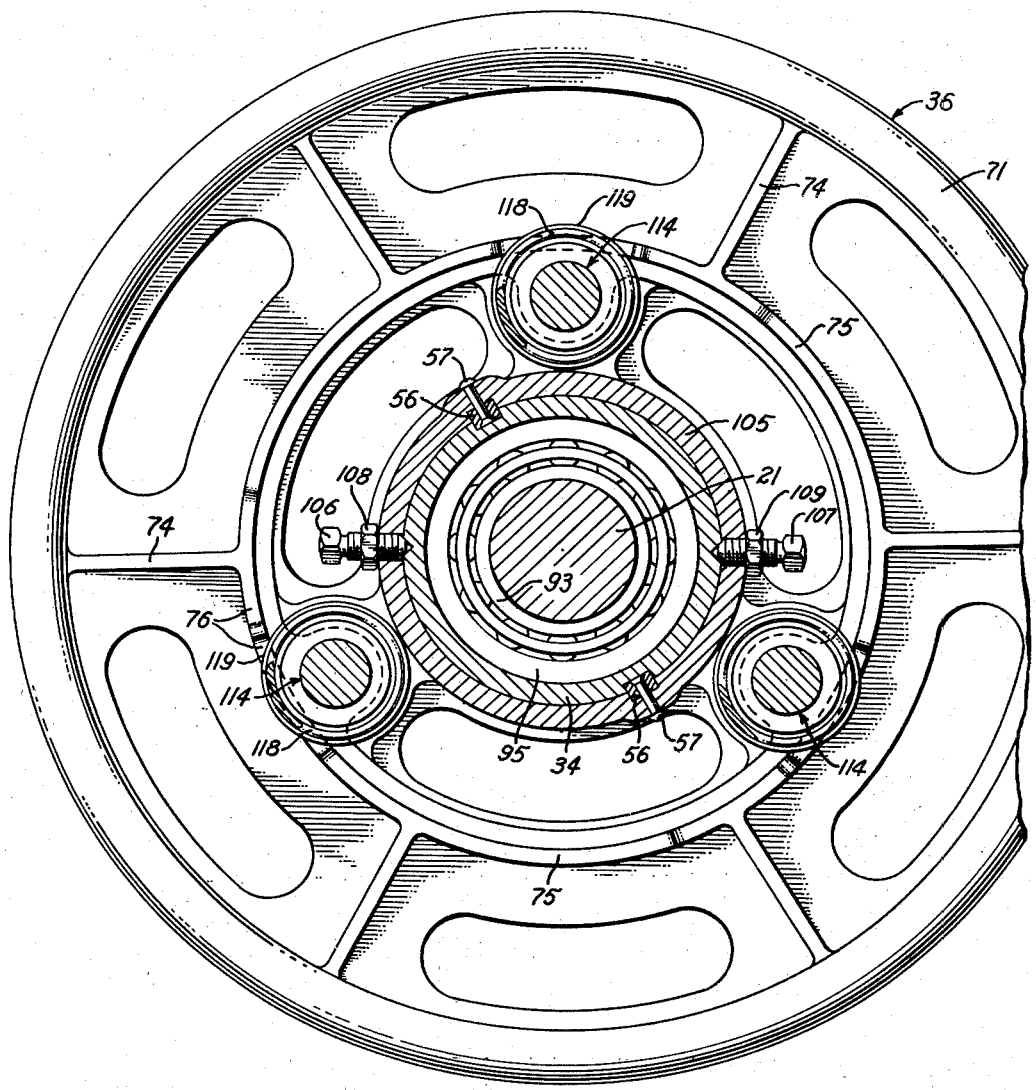
Fig. 8 is a side elevation, partially in section taken substantially along the line 8—8 in Fig. 6.

Turning now to Figs. 6 to 8, a refined and preferred embodiment of the invention is there shown. Insofar as the construction is similar to that previously described in connection with Figs. 1 to 5, the same reference characters are employed. As one principal difference, the freely rotatable hub 34 is journaled on the stub shaft 21 by a pair of tapered roller bearings 90 and 91 having inner races 92, 93 and outer races 94, 95, respectively. The latter are positioned axially by engagement with the shoulders 44 formed on the hub 34. The inner race 94 is axially engaged with a shoulder 96 on the stub shaft 21 and both bearings 90 and 91 held in place by shims 98, as necessary, and a lock ring 99 snapped into an annular groove 100 on the stub shaft 21.

Another difference of importance in the arrangement shown in Figs. 6 and 8 is the provision of means affording a more positive guiding of the clutch detent pins as they are moved axially by the cam element, assuring that the detent pins will not become "cocked" under relatively heavy loads and that they will always slide smoothly in being inserted into the drive plate 54 under the influence of springs or retracted from the drive plate by the cam element.

Such improvement is effected by a pin housing 105 constructed generally like the housing 52 described in Fig. 4. In the present instance, the pin housing 105 is locked against radial displacement relative to the hub 34 by two diametrically opposite set screws 106, 107. The set screws are threaded in the pin housing 105 and have frusto-conical ends received in matching conical recesses defined in the hub 34. Lock nuts 108 and 109, respectively, hold the screws 106 and 107 in a given setting. Additionally, the pin housing 105 includes an enlarged radial flange 110 at its left end in which a series (in this instance three) of enlarged apertures 111 are defined. The flange is widened to present bosses 112 around each of the apertures 111. Detent pins 114 having large diameter portions 115 and smaller diameter portions 116 are disposed for axial movement in the pin housing 105, the larger portions being slidably supported in the apertures 111 and the smaller portions in the openings 60 of the right flange 59. Means for biasing the pins 114 to one of their two positions, in this instance to the right where they are engaged with the drive plate 54, are provided in the form of compression springs 118. The latter are slipped over the respective bosses 112 and bear against recessed washers 119 held on the pins 114 between the shoulders formed at the junctions of the large and small portions 115 and 116, and lock rings 120 snapped into annular grooves defined in the portions 116. The washers 119 bear against the camming surfaces 75 of the cam element 36 and are therefore axially positioned according to the rotational setting of the cam element.

The operation of the springs 118 and the cam element 36 in effecting axial movement of the pins 114 selectively into and out of the corresponding openings 62 in the drive plate 54 is the same as that previously described with reference to Figs. 2 to 5. Merely by turning the cam element 36 an operator may cause the pins to clutch or declutch the hub 34 to the stub shaft 21 for either positive drive or free wheeling of the wheel 18. The pins 114 in the form shown in Figs. 6 and 8 are positively guided at their left ends and, therefore, supported against "cocking."

In the first embodiment shown by Fig. 4 the drive plate 54 is held axially in place on the splines of the stub shaft 21 by the lock ring 61. In the preferred form shown by Fig. 6 the lock ring 61 is omitted and the drive plate 54 held in place by the sprocket 27 in turn secured by a washer 121 fastened in place by a lock washer 122 and a stud 123 threaded into the stub shaft 21.

When the side-mounted implement is disconnected from the tractor, the drive assembly including the casing 28 and sprocket 27 are removed from the stub shaft 21 and replaced by a thrust sleeve 124 (Fig. 7). The latter is locked in place by the washer 121, lock washer 122 and stud 123, and includes a shoulder at 125 which bears against the drive plate 54 to take any side thrust exerted by the tractor wheel. By this arrangement, the lock ring 61 is not necessary, and when the drive assembly is removed, the tractor may be operated in the usual manner without first completely removing the present clutch kit and remounting the wheel directly on the axle 16. When the side-mounted implement is to be propelled by the tractor, it is only necessary to remove the sleeve 124 and replace the sprocket 27 and drive assembly housing 28 on the stub shaft 21.

I claim as my invention:

1. For use with a tractor having a flanged rear axle for carrying a traction wheel, a clutch kit comprising, in combination, a stub shaft adapted to be secured to the tractor axle in lieu of the wheel, a hub freely journaled on said stub shaft, a drive plate on said shaft and having a first series of circularly spaced axial openings, a pin housing on said hub and including two axially spaced radial flanges having second and third series of circularly spaced axial openings located to register with said first openings, a plurality of detent pins disposed in axially slidable relation in respective matching ones of said second and third openings, means for spring biasing said pins toward engagement with said first openings, and a cam element rotatably mounted on said hub and having a circular series of arcuate camming surfaces rising axially with circumferential displacement, and cam follower means on said pins biased into engagement with respective ones of said camming surfaces, whereby said pins extend into said first openings or are retracted from them depending upon the rotational setting of said cam element to clutch or declutch the wheel to said stub shaft.

2. For use with a tractor having a power axle and a rear wheel, and an implement side mounted on said tractor and having a ground wheel, a selective drive mechanism comprising the combination of a coaxial extension shaft secured to the end of the axle in lieu of the tractor wheel, a hub journaled on said shaft, means for mounting the wheel on said hub, a removable drive connection between said extension shaft and said ground wheel, a first flange fast on said hub having openings therethrough, a second flange fast on said shaft having openings therethrough adapted to register with said first flange openings, a plurality of detent pins carried in a first position in the openings of one of said flanges and axially movable to a second position to enter said openings in the other of said flanges, means for biasing said pins to one of said two positions, and a manually movable cam member and follower means on each of said pins engaged with said cam member for moving said pins to the other of said two positions to selectively cause said wheel to be free-wheeled on or power-driven by said shaft.

3. For use with a tractor having a flanged rear axle and a rear wheel normally fixed to said axle, and an implement side mounted on the tractor and having a ground wheel spaced outwardly from the latter to partially support the former, selective drive apparatus comprising, in combination, a stub shaft secured to the tractor axle in lieu of the rear wheel, a removable drive connection between said stub shaft and said implement ground wheel, a hub freely journaled on said stub shaft, means mounting said rear wheel on said hub, a flange member fixedly carried by said stub shaft, and means including a single manually positionable cam member and plural detent follower means cooperating with the cam member for selectively effecting a driving engagement between said flange and said hub to cause the rear tractor wheel to be optionally driven by or free-wheeled on the stub shaft.

4. For use with a tractor having a rear axle and a rear wheel normally fixed thereto, and an implement side mounted on the tractor and having an outboard ground wheel, the combination of an extension shaft fixed to said rear axle in lieu of the rear wheel, a removable drive connection between said extension shaft and said ground wheel, a hub journaled on said extension shaft, means fastening said rear tractor wheel to said hub, and means for releasably clutching said hub to said extension shaft so that drive effort may be transmitted from the tractor axle selectively either through the implement ground wheel alone or through both the implement ground wheel and the rear tractor wheel.

5. For use with a tractor having a rear axle and a wheel normally mounted thereon, and an implement side mounted on said tractor and having an outboard ground wheel, the combination comprising a stub shaft attached in coaxially extending relation to said rear axle in lieu of the tractor wheel, a removable drive connection between said stub shaft and the implement ground wheel, a hub freely journaled on said stub shaft, means mounting the tractor wheel on the hub, a first annular flange secured to said stub shaft and having circumferentially spaced axially extending openings through the periphery thereof, a second annular flange secured to said hub and having circumferentially spaced axially extending mating openings through the periphery thereof, said second flange being slightly spaced in an axial direction from said first flange, a plurality of detent pins carried in the openings of said second flange, means for spring biasing the pins through the second flange openings toward engagement with the first flange openings, and a cam element rotatably mounted on said hub and having plural arcuate camming surfaces rising axially with circumferential displacement, cam followers on said pins riding on said camming surfaces to restrain or release said pins into engagement with said first flange openings depending upon the circumferential setting of said cam element relative to said hub, whereby the tractor wheel may be free-wheeled on or operatively driven from the stub shaft depending upon the setting of the cam element.

6. In combination with a tractor having a rear drive axle and a rear wheel normally mounted on said axle, a selective drive mechanism comprising a stub shaft carried by and extending from said axle in lieu of the wheel, a hub freely journaled on said shaft, means for mounting said wheel on said hub, clutch members carried by said hub and said shaft, and manually shiftable means for drivingly connecting or releasing said clutch members, so that said wheel may be selectively operated as a free wheel or as a power wheel driven by the shaft, said stub shaft having means at its free end adapting it for connection with a shaft to be driven.

7. In combination with a tractor having a rear drive axle and a rear wheel normally fixed thereto, and an implement adapted to be side mounted on said tractor and having an outboard ground wheel, selective drive mechanism comprising a stub shaft carried by and extending from the tractor axle in lieu of the tractor wheel, means including detachable elements for connecting the shaft to impart motive power to the implement ground wheel, a hub freely journaled on said shaft, means for mounting the tractor wheel on said hub, and clutch members carried by said hub and said shaft, and manually shiftable means for drivingly connecting or releasing said clutch members, whereby said tractor wheel may be selectively operated as a free wheel or as a power wheel driven by the shaft.

8. In combination with a tractor having a flanged power axle and a wheel normally fixed to the axle flange, and an implement adapted to be side mounted on the tractor and having an outboard ground wheel, a selective drive mechanism comprising a coaxial extension shaft having an end flange carried by the axle flange in lieu of the wheel, means driven by said shaft and connected to the implement wheel for driving the same, a hub freely journaled on said extension shaft, means for mounting the tractor wheel on said hub, an annular flange member fixedly carried by said extension shaft, and means including a manually shiftable cam member for selectively effecting a driving engagement between said flange member and said hub to cause the tractor wheel to be selectively driven by or free-wheeled on the extension shaft.

References Cited in the file of this patent

UNITED STATES PATENTS

| Re. 9,823 | Fish | July 26, 1881 |
| 872,638 | Berner | Dec. 3, 1907 |
| 2,668,597 | King | Feb. 9, 1954 |

FOREIGN PATENTS

| 113,525 | Australia | July 31, 1941 |
| 244,698 | Great Britain | June 24, 1926 |